United States Patent [19]
Chien

[11] Patent Number: 5,980,060
[45] Date of Patent: *Nov. 9, 1999

[54] PORTABLE OBJECT HAVING A FASTENING BAND ILLUMINATED BY A SUPER THIN LIGHT ELEMENT

[76] Inventor: Tseng Lu Chien, 8F, No. 29, Alley 73, Lin-Shen St., Shi-Chi Town, Taipei, Taiwan

[*] Notice: This patent is subject to a terminal disclaimer.

[21] Appl. No.: 08/996,035

[22] Filed: Dec. 22, 1997

Related U.S. Application Data

[63] Continuation of application No. 08/766,805, Dec. 16, 1996, Pat. No. 5,746,501, which is a continuation of application No. 08/522,940, Sep. 1, 1995, abandoned.

[51] Int. Cl.⁶ .................................................. F21L 15/20
[52] U.S. Cl. .................... 362/103; 362/84; 362/806; 40/633; 368/282
[58] Field of Search ............................. 362/84, 103, 104, 362/108, 23, 253, 806, 812; 2/170, 905; 40/542, 544, 633; 368/239, 240, 281, 282, 285

[56] References Cited

U.S. PATENT DOCUMENTS

| | | | |
|---|---|---|---|
| 3,153,745 | 10/1964 | Gurian et al. | 315/206 |
| 4,130,987 | 12/1978 | Schickedanz | 368/29 |
| 4,774,642 | 9/1988 | Janko et al. | 362/108 |
| 4,895,110 | 1/1990 | Lo Cascio | 362/108 |
| 5,067,063 | 11/1991 | Granneman et al. | 362/156 |
| 5,151,678 | 9/1992 | Veltri et al. | 340/321 |
| 5,245,516 | 9/1993 | De Hass et al. | 362/108 |
| 5,245,517 | 9/1993 | Fenton | 362/156 |
| 5,249,106 | 9/1993 | Barnes et al. | 362/108 |
| 5,285,430 | 2/1994 | Decker | 368/281 |
| 5,370,082 | 12/1994 | Wade | 119/859 |
| 5,381,318 | 1/1995 | Fang | 362/108 |
| 5,469,342 | 11/1995 | Chien | 362/84 |
| 5,515,247 | 5/1996 | Cheung et al. | 362/84 |
| 5,649,381 | 7/1997 | Studer | 40/633 |
| 5,746,501 | 5/1998 | Chien | 362/103 |

*Primary Examiner*—Alan Cariaso
*Attorney, Agent, or Firm*—Bacon & Thomas PLLC

[57] ABSTRACT

A portable object having a display and a fastening band includes, on the fastening band, a super thin lighting element. The portable object could, for example, be a wrist watch, heart monitor, or compass, and could be permanently or removably attached to the band. A power pack for the super thin lighting element may be provided in the object itself, with the super thin lighting element having centrally located contacts.

32 Claims, 6 Drawing Sheets

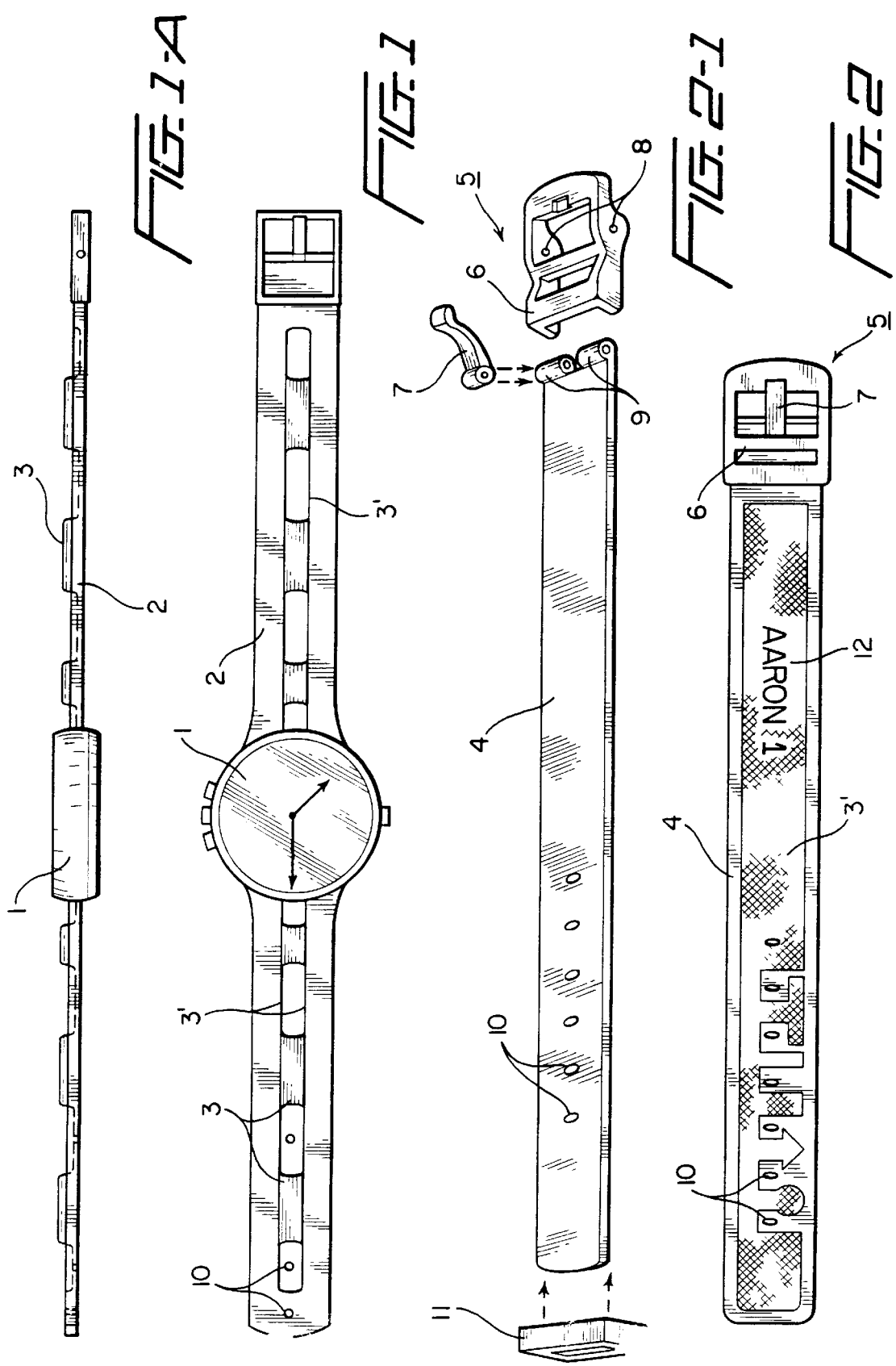

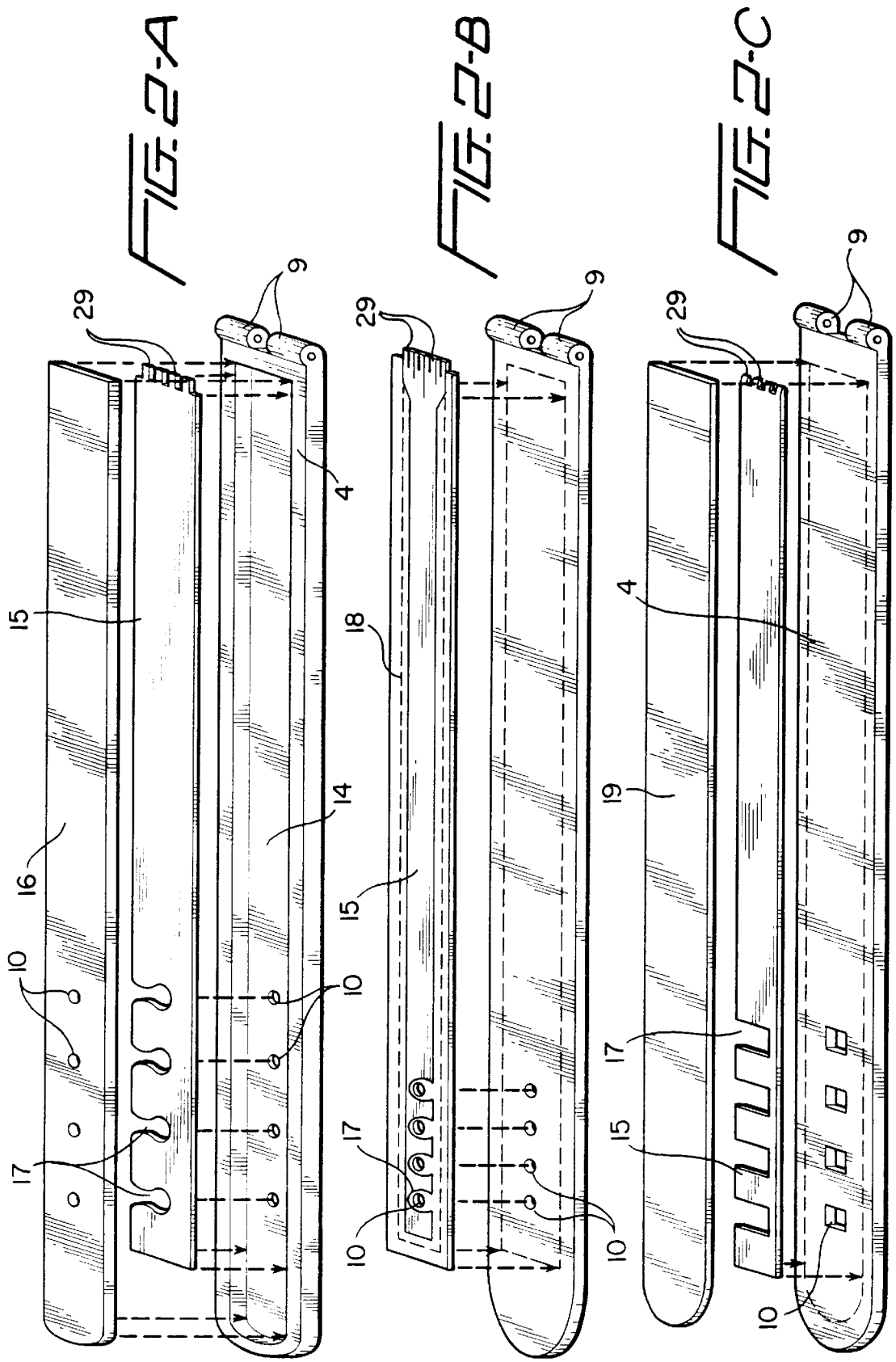

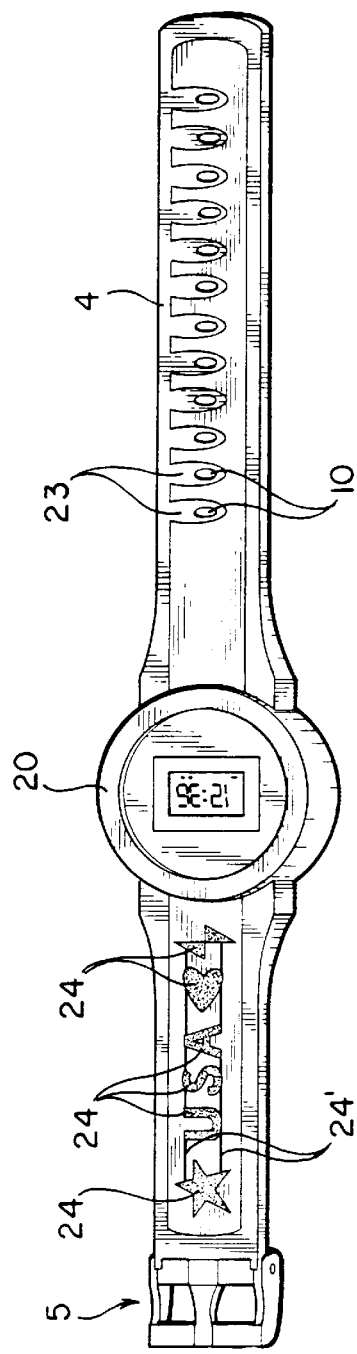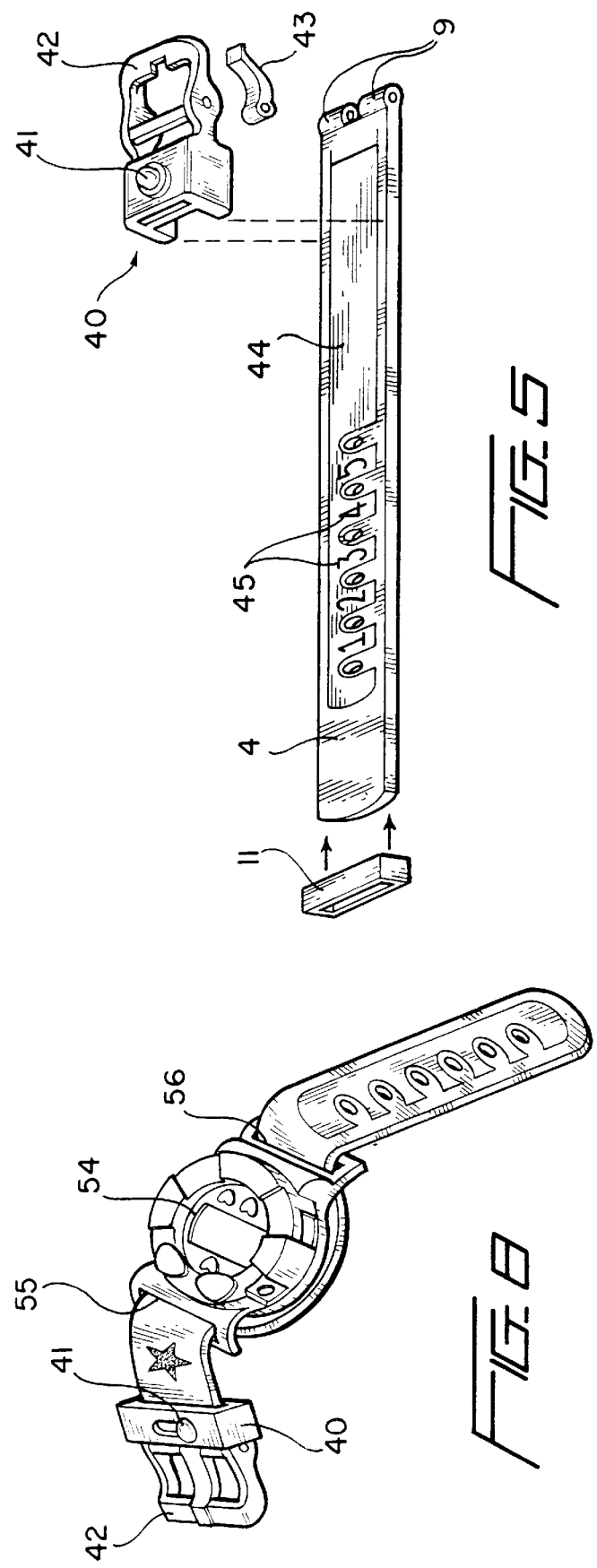

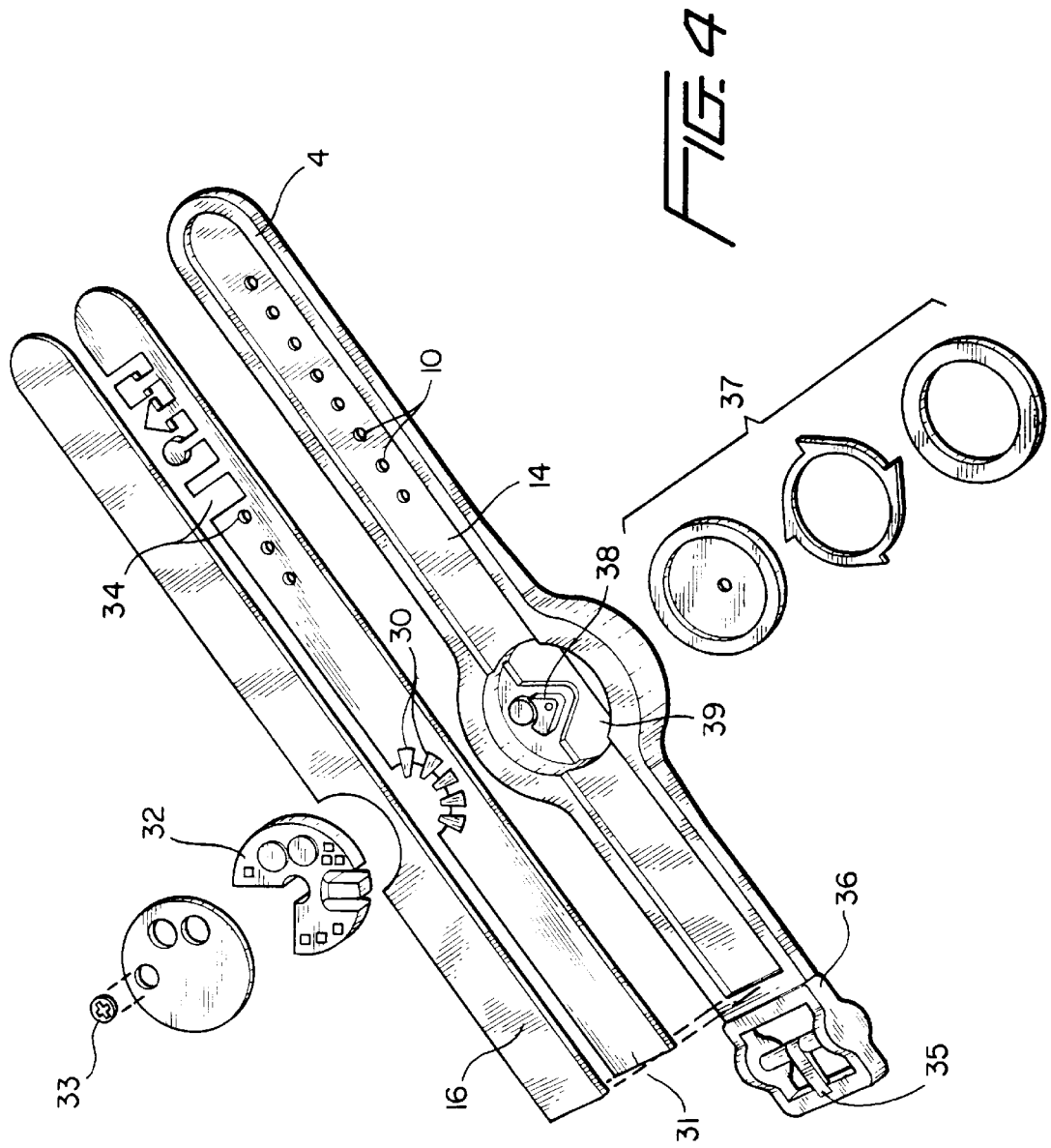

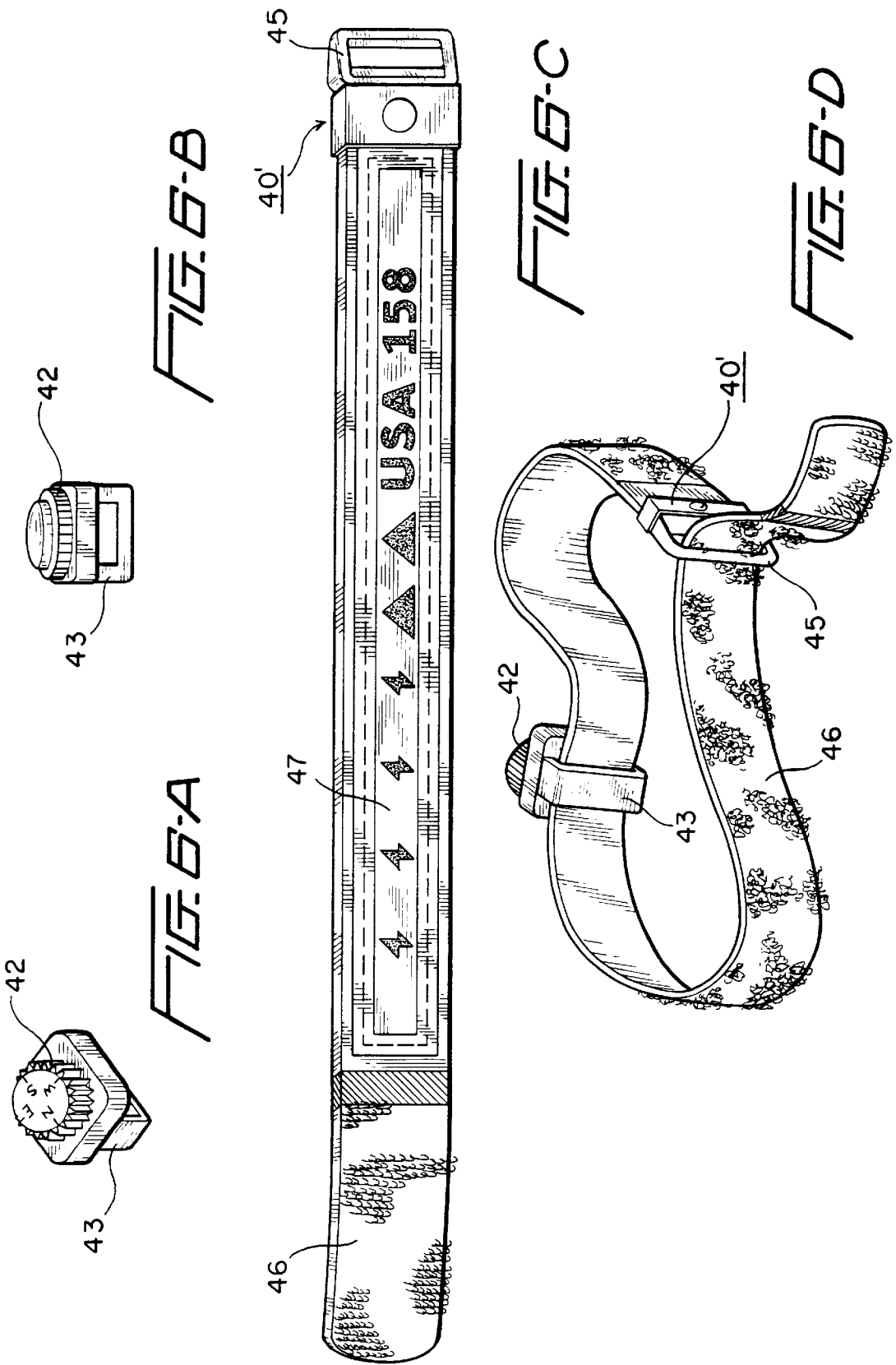

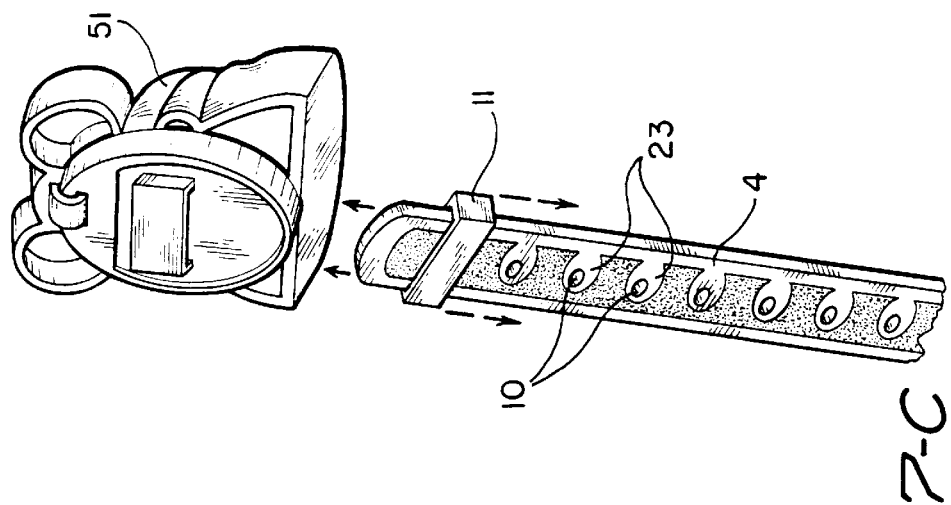
FIG. 7-C
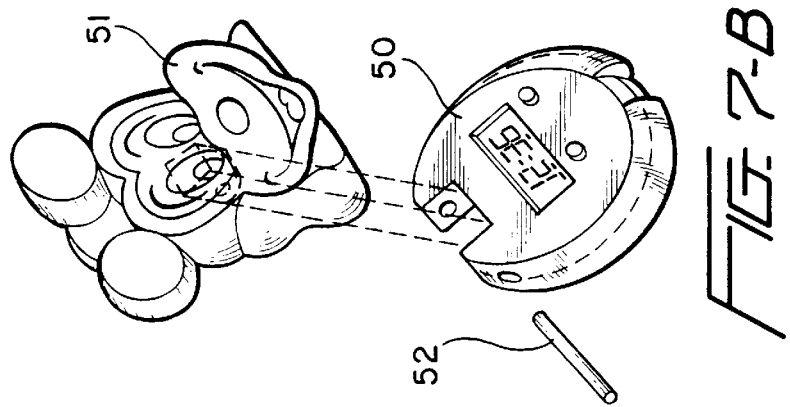
FIG. 7-B
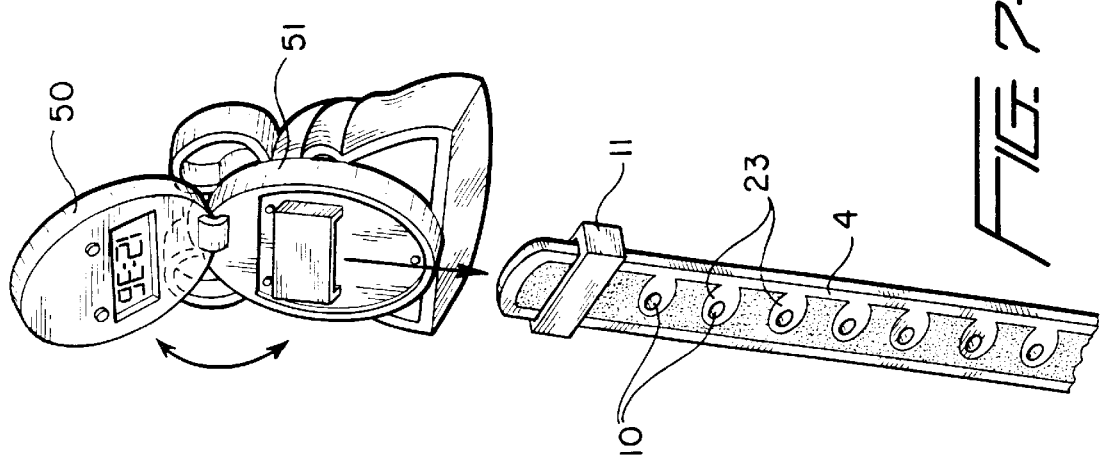
FIG. 7-A

PORTABLE OBJECT HAVING A FASTENING BAND ILLUMINATED BY A SUPER THIN LIGHT ELEMENT

CROSS-REFERENCE TO RELATED APPLICATIONS

This application is a continuation of U.S. patent application Ser. No. 08/766,805, filed Dec. 16, 1996, now U.S. Pat. No. 5,746,501, which is a continuation of U.S. patent application Ser. No. 08/522,940, filed Sep. 1, 1995, now abandoned.

BACKGROUND OF THE INVENTION

1. Field of the Invention

This invention relates to a portable object, such as a watch, having an illuminated fastening band, and more particularly to a portable object having a fastening band illuminated by a super thin lighting element. By "super thin" lighting element is meant a lighting element of the type containing a chemical sandwiched between protective layers, such as an electro-luminescent strip or panel, which typically has a thickness of less than ten millimeters.

2. Discussion of Related Art

Super thin lighting elements such as electro-luminescent strips or panels offer a number of advantages over conventional lighting elements such as incandescent light bulbs and light emitting diodes. These advantages include flexibility, which allows the lighting elements to follow curves on the object to which they are attached, the ability to be printed or silk-screened with logos, marks, figures, and characters, or to be stenciled or masked, a wide variety of color choices, including green, blue, pink, yellow, and white, and low assembly and design costs. These advantages are explained in a number of pending U.S. patent applications and issued patents of the Inventor, including U.S. patent application Ser. Nos. 08/226,322 now U.S. Pat. No. 5,475,574; 08/305,294 now U.S. Pat. No. 5,572,817; 08/343,404 now U.S. Pat. No. 5,736,542; 08/343,915 now U.S. Pat. No. 5,836,671; 08/383,404 now U.S. Pat. No. 5,667394; 08/383,405 now U.S. Pat. No. 5,722,760; 08/421,647 now U.S. Pat. No. 5,688,038; 08/432,707 now allowed; 08/438,373 now U.S. Pat. No. 5,570,946; 08/444,064 now U.S. Pat. No. 5,720,651; 08/436,007 now U.S. Pat. No. 5,479,325.

In addition to the Inventor's own patents and patent applications, the following prior publications are of particular interest as background for the present invention:

British published patent specification 166,534 discloses a "wearing device for a person" in which super thin lighting elements are used to illuminate a harness which fits around the shoulder and waist of the user for use by crossing guards. U.S. Pat. No. 4,895,110, on the other hand, discloses a pet collar having a super thin lighting element attached thereto, while U.S. Pat. Nos. 5,151,678 and 5,245,516 disclose safety belts illuminated by super thin lighting elements.

The illuminated straps, belts, or collars disclosed in the prior U.S. patents all have in common the use of large area electro-luminescent lighting elements for the purpose of making the devices to which they are attached more visible to motorists. In general, the illumination arrangements disclosed therein are relatively expensive, because of the large amount of electro-luminescent material used, and the function of the devices is limited to warning purposes. While the copending applications of the Inventor, which are not to be considered prior art, disclose more versatile super thin lighting arrangements, they are not directed to the type of illuminated object with which the present invention is concerned, namely objects having fastening bands designed to be worn by the user, such as wrist watches and other timers, and also heart monitors, pedometers, compasses, children's jewelry, and the like. Illumination of this type of object provides a significant advantage over prior "safety band" illumination arrangements because the type of object with which the present invention is concerned has uses apart from the warning function, and thus are likely to be worn more often than a dedicated safety band, while still providing a measure of protection to the wearer in dark environments, particularly as a warning to motorists.

On the other hand, because the objects with which the present invention is concerned are intended for everyday use in a variety of circumstances, attractiveness both when lighted and unlighted is an important consideration that was not of great concern to the designers of the abovementioned safety belts, collars, and straps.

SUMMARY OF THE INVENTION

It is accordingly an objective the invention to provide an illumination arrangement for an object having a fastening band, which is relatively low in cost and provides greater versatility than prior arrangements.

It is a further objective of the invention to provide an illumination arrangement for the fastening bands of objects such as wrist watches and other timers, and also heart monitors, pedometers, compasses, children's jewelry, and the like, which heretofore have not been illuminated.

It is a still further objective of the invention to provide an illumination arrangement for the fastening bands of objects intended to be worn for purposes other than warning motorists of the presence of the wearer, and for which attractive in both darkness and light is an important consideration.

These objectives are accomplished, in accordance with various preferred embodiments of the invention, by providing a portable object with a fastening band having affixed thereon a super thin lighting element for carriage by a person or animal. Optionally, the fastening band has provided thereon, or forms, an at least partially transparent optical element capable of creating a light emission pattern to illuminate the entire band as well as the object to which the band is attached.

In an especially preferred embodiment of the invention, the power pack for the super thin lighting element is situated near a center of the lighting element, and the super thin lighting element emits light toward the face of the main object. Preferably, the invention makes use of the electro-luminescent strip structure disclosed in U.S. patent application Ser. No. 08/186,291 now U.S. Pat. No. 5,469,342. In this embodiment, an electro-luminescent strip having an area of less than 38 $cm^2$ includes input power contacts near the center of the strip.

In an alternative embodiment of the invention, the super thin lighting element has end terminals or contacts, and the power pack is provided in the buckle or loop at the end of the adjustable band by which the portable object is fastened to the wearer.

BRIEF DESCRIPTION OF THE DRAWINGS

FIG. 1 is a top view of a first preferred embodiment of the invention, in which the portable object is in the form of a wrist watch having an illuminated band.

FIG. 1-A is a side view of the wrist watch of FIG. 1.

FIG. 2 is a top view showing an alternative strip arrangement for a watch band according to a second preferred embodiment of the invention.

FIG. 2-1 is a perspective view showing band construction details for use in the bands illustrated in FIGS. 1 or 2.

FIGS. 2-A to 2-C are perspective views showing variations of the illuminated band of FIG. 2.

FIG. 3 shows a digital wrist worn device utilizing the principles of construction illustrated in FIGS. 1 and 2.

FIG. 4 is a perspective view showing a preferred centrally located power pack construction.

FIG. 5 is a perspective view showing an alternative preferred end located power pack construction.

FIG. 6-A is a perspective view of a removable object for use with the band shown in FIGS. 6-C and 6-D.

FIG. 6-B is a side view of the object shown in FIG. 6-A.

FIG. 6-C is a perspective view of a band for use with the removable object of FIGS. 6-A and 6-B.

FIG. 6-D is a perspective view showing the manner in which the object shown in FIGS. 6-A and 6-B is fitted on the band shown in FIG. 6-D.

FIGS. 7-A to 7-C are perspective views showing an alternative removable object suitable for use with the band of FIGS. 6-A to 6-D.

FIG. 8 is a perspective view showing an alternative arrangement by which the preferred illuminated strap may be attached to a removable object.

DETAILED DESCRIPTION OF THE PREFERRED EMBODIMENTS

As illustrated in FIGS. 1 and 1-A, the invention includes a portable object 1 of the type having a display and a fastening band 2 which includes super thin lighting elements 3 affixed thereto and connected by wires 3' to a centrally located power pack (described in more detail below. Those skilled in the art will appreciate that the super thin lighting elements could include either electro-luminescent (EL) strips, photo-luminescent (PL) strips, or combination EL and PL strips formed by mixing together EL and PL particles within a single carrier or by joining together discrete EL and PL elements. In addition, although the portable object illustrated is an ordinary wrist watch, those skilled in the art will appreciate that the invention applies to a variety of portable objects having fastening bands, as will become more apparent from the discussion of the alternative embodiments of the invention.

Details of the conventional low cost single strap watch band to which the super thin lighting element is applied are shown in FIG. 2-1. In addition to the strap 4, the band includes a buckle 5 the main body 6 of which fits over the end of the band and is secured thereto, together with tongue 7, by means of a pin (not shown) which is fitted through pivot openings 8 and pivot cylinders 9 on the strap itself. Tongue 7 is arranged to engage one of the openings 10 when the strap has been fitted through the buckle, as is well known, to form a circle around the wrist of the wearer. Finally, a band 11 may be placed over the strap 4 to retain the end of the strap after buckling.

As indicated in FIG. 2, in the most basic embodiment of the invention, the EL strip 3 is a single element which is placed on the strap 4 and shaped to avoid covering the openings 10. As is apparent from FIG. 2, the shape of the strip can be varied as desired, particularly in the area of openings 10, and in addition the electro-luminescent strip 3' can have printing 12 thereon. In this embodiment, the strip 3' can be attached to the strap 4 by any suitable means, including adhesives and stitching.

Preferably, however, the super thin lighting element is attached to the strap 4 by one of the variations shown in FIGS. 2A–2C. In the first of these variations, illustrated in FIG. 2-A, the strap 4 includes a recess 14 shaped to accommodate electro-luminescent strip 15, and further includes a protective member 16 which covers the electro-luminescent strip and which can provide sealing against moisture and, if desired, harmful ultraviolet radiation. openings 10 in this embodiment are present in both the strap itself and the protective member 16, and are aligned with U-shaped indentations 17 in the electro-luminescent strip 15. Sealing of the protective member 16 to the strap 14 can be by means of, for example, ultra-sonic welding, press-fitting, or by a mechanical fastening means. In addition, it will be appreciated by those skilled in the art that either the protective member 16, the strap 4, or both must be at least partially transparent to permit passage of light from the super thin lighting element 15.

This embodiment has the advantage that the protective member can be provided with optical properties such as light magnification or diffusion, thereby permitting a reduction in the size of the super thin lighting element or elements required to achieve a desired lighting effect.

Alternatively, in the variation illustrated in FIG. 2-B, the super thin lighting element or elements 15 can be sealed in an at least partially transparent envelope 18 which is attached directly to the strap 4 by permanent or non-permanent fastening means such as double-sided tape, a VELCRO™ hook and loop fastener, an adhesive, or by stitching or, in the variation shown in FIG. 2-C, by overlaying the super thin lighting element by as thin sheet of material 19 which can be attached to the strap 4 by solvents or other adhesive means.

It will be noted that in the variations shown in FIGS. 2-A to 2-C, the terminals or contacts 29 for electrically connecting the super thin lighting element to a power source and/or control circuit are illustrated as being on the end of the strip, so that they can be connected by wires or other means to a suitably placed power pack, or to a power pack of the type shown in FIG. 5. Alternatively, the contacts may be located at the center of the super thin lighting element in the manner described in U.S. patent application Ser. No. 08/186,291 now U.S. Pat. No. 5,469,342 and illustrated in FIG. 4, described in more detail below. In addition, it will be noted that if the super thin lighting element is a photo-luminescent strip, no contacts are necessary.

The principles described above can also be applied to portable objects other than wrist watches. For example, FIG. 3 is intended to represent a generic wrist worn device 20 having a digital display, and which could be a heart or pulse monitor, pedometer, temperature display, compass, or the like. In this embodiment, the lighting arrangement includes not only a strip 21 having U-shaped indentations 23 as described above, but also a portion having a plurality of strips 24 connected by wires 24' and shaped respectively as a star, a heart, a lightning bolt, and in the form of letters. Alternatively, a single strip having printed thereon a star, a heart, and so forth may be used.

The centrally located power pack arrangement for the super thin lighting elements mentioned above is illustrated in FIG. 4. In this arrangement, the terminals or contacts 30 for the super thin lighting element are positioned in the center of the electro-luminescent strip 31. Electrical connection to the terminals is achieved by means of traces on an arc-shaped printed circuit board 32 which contains the necessary inverter circuitry for converting DC current supplied by battery 33 to AC current of an appropriate frequency and voltage, and controlled by either a conventional circuit or by an integrated circuit such as is disclosed in copending U.S. patent application Ser. No. 08/518,594, filed Aug. 11, 1995 now U.S. Pat. No. 5,754,064 in the name of the present Inventor, to obtain various special effects such as flashing at steady or random intervals, fade in-fade out, and so forth.

In the embodiment shown in FIG. 4, the electroluminescent strip 31 has a variety of different shaped openings 34 for the tongue 35 of buckle 36. in addition, in this embodiment of the invention, the strip passes through the central opening for the components 37 of the device to be illuminated, and a lower contact 38 is placed at the bottom of the central opening. The strap itself is the same as strap 4 shown in FIG. 2-A, including recess 14 for accommodating the protective member 16. finally, in this embodiment, contact between the terminals in the central portion of the object opening 39 and the strip contacts can be established by soldering, conductive rubber terminals, or simply by pressure established upon assembly, and the strip itself can be in the form of a multi-colored panel which can have any desire shape so long as it fits on the band.

Alternatively, in the embodiment shown in FIG. 5, the power pack is in the buckle 40, illustrated as including a push-button on/off switch 41, and a standard frame 42 and tongue 43. The super thin lighting element 44 is illustrated as including printing 45 thereon and has contacts 45 at one end of the strip so as to be connected to circuitry in the power pack in a manner similar to that of the embodiment shown in FIG. 4. This embodiment permits the main object to be removed from the band, and the band to be used with different main objects.

In the embodiment shown in FIGS. 6-A to 6-D, the object is a compass 42 having a bracket 43 through which the illuminated strap 44 may be inserted. In this embodiment, the strap is adjustably secured to the wearer by means of a loop 45 and VELCRO™ hook and loop fastener covered portions 46. Power to the super thin lighting element 47 is provided by a power pack 40' similar to that shown in FIG. 5.

Finally, in the embodiment shown in FIGS. 7-A to 7-C, the removable object is a children's digital watch having a watch section 50 and a cover 51 pivotally attached thereto by a 53, while in the embodiment shown in FIG. 8, the main object has two end-loops through which the band is pulled rather than a single centrally located loop or a central power pack arrangement of the type shown in FIG. 4, the power pack 40 being located at the end of the strap in the manner shown in FIG. 5, thus enabling the band to be removed from the object.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

We claim:

1. In an arrangement made up of a portable object having a display, said display including means for displaying a variable message; an adjustable band having two ends and adapted to be worn around a body part of a wearer; means for mounting said object on said band; and means for adjustably fastening the band around the body part of the wearer by fastening the two ends to each other, the improvement comprising:

at least one super thin lighting element on said band, said super thin lighting element being in addition to said means for displaying a variable message;

means for mounting the super thin lighting element on said band;

means for energizing the super thin lighting element to cause the super thin lighting element to emit light; and means for mounting the energization means on said band at a location away from said two ends.

2. An arrangement as claimed in claim 1, wherein said means for mounting the object on the band comprises means for permanently mounting said object on the band.

3. An arrangement as claimed in claim 1, wherein said means for mounting the object on the band comprises means for removably mounting said object on the band.

4. An arrangement as claimed in claim 1, wherein the object is a compass.

5. An arrangement as claimed in claim 1, wherein the object is a watch.

6. An arrangement as claimed in claim 1, wherein the object is a heart monitor.

7. An arrangement as claimed in claim 1, wherein the object displays a physical parameter.

8. An arrangement as claimed in claim 1, wherein the super thin lighting element is made up of a plurality of segments having at least two terminals.

9. An arrangement as claimed in claim 8, wherein said terminals are located at a center of the super thin lighting element, wherein the band is arranged to pass through the object, and wherein said energization means comprises a power supply for the lighting element, said power supply being located in the object such that when the object is positioned over said terminals, an electrical connection is established between said terminals and the lighting element.

10. An arrangement as claimed in claim 8, wherein said terminals are located at an end of the super thin lighting element.

11. An arrangement as claimed in claim 1, wherein said means for adjustably fastening the band around a body part of the wearer comprises a buckle attached to one of said ends of the band, said buckle including a main body fitted with a tongue, said tongue being arranged to engage one of a plurality of openings in the band when the other of said two ends has been fitted through the buckle, wherein said super thin lighting element includes U-shaped indentations to permit passage of said tongue, and which are aligned with said openings in said band.

12. An arrangement as claimed in claim 1, wherein said means for fastening the band around a body part of the wearer comprises a buckle attached to one of said ends of the band, said buckle including a main body fitted with a tongue, said tongue being arranged to engage one of a plurality of openings in the band when the other of said two ends has been fitted through the buckle, wherein said super thin lighting element includes openings aligned with and larger than said openings in the band to permit easy insertion of said tongue of said buckle.

13. An arrangement as claimed in claim 12, wherein said openings have a variety of shapes.

14. An arrangement as claimed in claim 1, wherein said means for fastening the band around a body part of the wearer comprises a buckle attached to one of said ends of the band, said buckle including a main body fitted with a tongue, said tongue being arranged to engage one of a plurality of openings in the band when the other of said two ends has been fitted through the buckle.

15. An arrangement as claimed in claim 1, wherein said means for fastening the band around a body part of the wearer includes an adjustable bracket and VELCRO™ hook and loop fastener for fastening the band on a wearer.

16. An arrangement as claimed in claim 1, wherein said means for fastening the band around a body part of the wearer includes a bracket and a buckle for fastening the band on a wearer.

17. An arrangement as claimed in claim 1, wherein the object is removable and has at least one slot through which the band is passed.

18. An arrangement as claimed in claim 1, wherein the object is at least partially transparent to permit light to pass from the super thin lighting element to pass through the object.

19. An arrangement as claimed in claim 1, wherein the super thin lighting element has a plurality of multi-colored segments.

20. An arrangement as claimed in claim 1, wherein said means for mounting the super thin lighting element on the band comprises means for fixedly attaching the lighting element to a surface of the band.

21. An arrangement as claimed in claim 1, wherein said means for mounting the super thin lighting element on the band comprises means for removably attaching the lighting element to a surface of the band.

22. An arrangement as claimed in claim 1, wherein the super thin lighting element is sealed within an envelope attached to the band.

23. An arrangement as claimed in claim 1, wherein the super thin lighting element is sealed between multiple layers of the band, a portion of at least one of which is transparent.

24. An arrangement as claimed in claim 23, wherein the at least one transparent layer has magnification properties.

25. An arrangement as claimed in claim 23, wherein the at least one transparent layer has an opening through which the super thin lighting element is visible.

26. An arrangement as claimed in claim 1, wherein the super thin lighting element has printing thereon.

27. An arrangement as claimed in claim 1, wherein the super thin lighting element extends along the length of the band.

28. An arrangement as claimed in claim 1, wherein the band includes means for directing the light emitted therefrom.

29. An arrangement as claimed in claim 1, wherein the super thin lighting element is made up of segments having a variety of shapes.

30. An arrangement as claimed in claim 1, wherein the display is a non-electric display.

31. An arrangement as claimed in claim 1, wherein the object is an electrical device.

32. An arrangement as claimed in claim 1, wherein the band is made of a rigid material.

* * * * *